United States Patent
Chapin et al.

(10) Patent No.: US 6,510,027 B1
(45) Date of Patent: Jan. 21, 2003

(54) DISC HEAD SLIDER HAVING HIGHLY DAMPED BEARING WITH MULTIPLE PRESSURE GRADIANT-GENERATING PADS

(75) Inventors: Mark A. Chapin, Boulder, CO (US); Michael D. Mundt, Longmont, CO (US); James M. Murphy, Boulder, CO (US); Anthony P. Sannino, Shakopee, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 19 days.

(21) Appl. No.: 09/637,271

(22) Filed: Aug. 10, 2000

Related U.S. Application Data

(63) Continuation-in-part of application No. 09/549,424, filed on Apr. 13, 2000, and a continuation-in-part of application No. 09/548,148, filed on Apr. 13, 2000.
(60) Provisional application No. 60/181,911, filed on Feb. 11, 2000.

(51) Int. Cl.⁷ .............................................. G11B 21/21
(52) U.S. Cl. ................................ 360/235.8; 360/235.7; 360/236.3
(58) Field of Search ........................ 360/235.4, 235.8, 360/236.1, 236.6, 236.8, 236.9, 237

(56) References Cited

U.S. PATENT DOCUMENTS

| | | | |
|---|---|---|---|
| 4,212,044 A | 7/1980 | Plotto | |
| 4,218,715 A | 8/1980 | Garnier | |
| 4,553,184 A | 11/1985 | Ogishima | |
| 4,646,180 A | 2/1987 | Ohtsubo | |
| 4,757,402 A | 7/1988 | Mo | |
| 4,984,114 A | 1/1991 | Takeuchi et al. | |
| 5,052,099 A | 10/1991 | Taguchi et al. | |
| 5,079,657 A | * 1/1992 | Aronoff et al. | |
| 5,086,360 A | 2/1992 | Smith et al. | |
| 5,128,822 A | 7/1992 | Chapin et al. | |

(List continued on next page.)

FOREIGN PATENT DOCUMENTS

| | | |
|---|---|---|
| EP | 0 442 660 A2 | 8/1991 |
| JP | 54-23517 | 2/1979 |
| JP | 56-107363 | 8/1981 |
| JP | 60-242548 | 12/1985 |
| JP | 63-037874 | * 2/1988 |
| JP | 1-211383 | 8/1989 |
| JP | 1-245480 | 9/1989 |
| JP | 1-319188 | 12/1989 |
| JP | 3-132981 | 6/1991 |
| JP | 8-212740 | 8/1996 |
| WO | WO 99/00792 | 1/1999 |

OTHER PUBLICATIONS

IBM Technical Disclosure Bulletin, "Magnetic Disk Storage System with Structured Magnetic Head Slider", vol. 27, No. 10A, Mar. 1995, pp. 5820–5821.

*Primary Examiner*—Craig A. Renner
(74) *Attorney, Agent, or Firm*—Westman, Champlin & Kelly

(57) ABSTRACT

A disc head slider includes a slider body having a leading edge, a trailing edge, a slider length measured from the leading edge to the trailing edge, a central-recess floor and a plurality of raised rails. Each raised rail forms a respective bearing surface. At least one of the raised rails has a recessed rail surface, which is recessed from the respective bearing surface and raised from the central recess floor. At least twenty isolated bearing pads are positioned on the recessed rail surface and together form at least part of the respective bearing surface. Each bearing pad has a pad length and a pad width, which are at least one percent of the slider length.

18 Claims, 8 Drawing Sheets

U.S. PATENT DOCUMENTS

| | | |
|---|---|---|
| 5,200,868 A | 4/1993 | Chapin et al. |
| 5,218,494 A | 6/1993 | Chapin et al. |
| 5,267,104 A | 11/1993 | Albrecht et al. |
| 5,317,465 A | 5/1994 | Chapin et al. |
| 5,343,343 A | 8/1994 | Chapin |
| 5,359,480 A | 10/1994 | Nepela et al. |
| 5,418,667 A | 5/1995 | Best et al. |
| 5,490,026 A | 2/1996 | Dorius et al. |
| 5,499,149 A | 3/1996 | Dovek |
| 5,513,056 A | 4/1996 | Kawasaki et al. |
| 5,550,693 A | 8/1996 | Hendriks et al. |
| 5,625,512 A | 4/1997 | Smith |
| 5,636,085 A | 6/1997 | Jones et al. |
| 5,737,151 A | 4/1998 | Bolasna et al. |
| 5,761,004 A | 6/1998 | Peck |
| 5,768,055 A | 6/1998 | Tian et al. |
| 5,796,551 A | 8/1998 | Samuelson |
| 5,815,346 A | 9/1998 | Kimmel et al. |
| 5,841,608 A | 11/1998 | Kasamatsu et al. |
| 5,953,181 A | 9/1999 | Utsunomiya |
| 5,963,396 A | 10/1999 | Burga et al. |
| 5,973,881 A | 10/1999 | Ajiki |
| 6,212,042 B1 * | 4/2001 | Gui et al. ............. 360/236.6 |

* cited by examiner

TIME (SEC)

DISC HEAD SLIDER HAVING HIGHLY DAMPED BEARING WITH MULTIPLE PRESSURE GRADIANT-GENERATING PADS

CROSS-REFERENCE TO RELATED APPLICATIONS

This application claims the benefit of U.S. Provisional Application Ser. No. 60/181,911, entitled "HIGHLY DAMPED AIR BEARING," filed Feb. 11, 2000, and is a continuation-in-part of U.S. application Ser. No. 09/549,424, entitled DISC HEAD SLIDER HAVING RECESSED, TRENCHED RAILS FOR REDUCED STICTION," filed Apr. 13, 2000, and of U.S. application Ser. No. 09/548,148 entitled "DISC HEAD SLIDER HAVING RECESSED, TRENCHED RAILS FOR ENHANCED DAMPING," filed on Apr. 13, 2000.

Cross reference is also made to U.S. Ser. No. 09/398,993, entitled "CONVERGENT CHANNEL, TRENCHED DISC HEAD SLIDER," filed Sep. 17, 1999.

BACKGROUND OF THE INVENTION

The present invention relates to disc drive data storage systems and, more particularly, to a disc drive data storage system having a slider with an increased bearing stiffness.

Disc drives of the "Winchester" and optical types are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider fly above or in close proximity to the disc surface.

During normal operating conditions, the slider is subjected to fly height modulations. These modulations are a result of a number of excitations, including intermittent head-asperity contacts, disc roughness, high-speed seeks and operating shocks. At current head-disc spacing values, disc roughness excitations have been shown to modulate the fly height by 10 percent of the nominal fly height, while asperity contacts can modulate the fly height by up to 80 percent. Moreover, the percentage of fly height modulation continues to increase as fly heights continue to decrease. This fly height modulation can degrade recording performance and can cause further contact between the head and the disc. Given the sensitive nature of the head-disc interface, such fly height modulations should be avoided or reduced as much as possible.

A slider is desired, which dampens head-media separation modulation in response to dynamic excitations.

SUMMARY OF THE INVENTION

One aspect of the present invention relates to a disc head slider, which includes a slider body having a leading edge, a trailing edge, a slider length measured from the leading edge to the trailing edge, a central recess floor and a plurality of raised rails. Each raised rail forms a respective bearing surface. At least one of the raised rails has a recessed rail surface, which is recessed from the respective bearing surface and raised from the central recess floor. At least twenty isolated bearing pads are positioned on the recessed rail surface and together form at least part of the respective bearing surface. Each bearing pad has a pad length and a pad width, which are at least one percent of the slider length.

Another aspect of the present invention relates to a disc head slider, which includes a central recess floor and first and second rails disposed about the central recess floor. Each rail includes a leading bearing surface, a recessed rail surface and a trailing bearing surface. The recessed rail surface extends rearward from the respective leading bearing surface, is recessed from the respective leading and trailing bearing surfaces, and is raised from the central recess floor. The trailing bearing surface is formed at least in part by a plurality of isolated bearing pads positioned on the recessed rail surface. Each bearing pad includes a convergent channel, which is recessed within the bearing pad and has a leading channel end open to fluid flow from the recessed rail surface, non-divergent channel side walls and a trailing channel end closed to the fluid flow and forward of a localized region of the respective bearing pad.

Yet another aspect of the present invention relates to a disc drive assembly, which includes a disc rotatable about a central axis and a slider supported over the disc. The slider has a bearing surface with features for generating a plurality of individual pressure gradients along the bearing surface, which are adapted for dampening vibrations in the slider as the disc rotates beneath the slider about the central axis.

DETAILED DESCRIPTION OF ILLUSTRATIVE EMBODIMENTS

Figure 1:
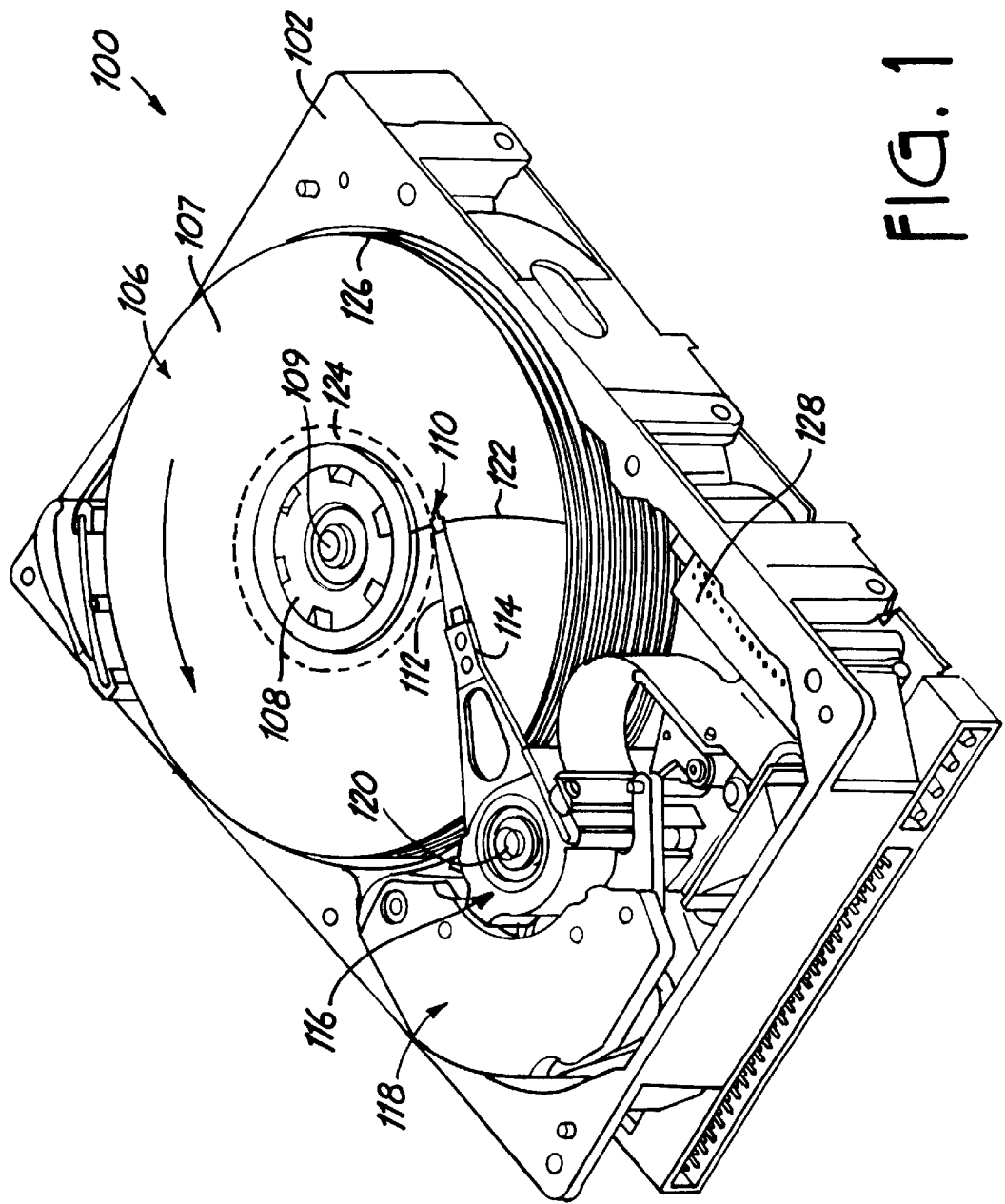
FIG. 1 is a perspective view of a disc drive in which the present invention is useful.

FIG. 1 is a perspective view of a disc drive 100 in which the present invention is useful. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

As discussed in more detail below, each slider 110 has a hydrodynamic (e.g., air) bearing that quickly dampens the vibrational response of the slider due to dynamic excitation sources such as intermittent head-asperity contacts, disc roughness, high speed seeks, operating shocks and disc micro-waviness. This reduces modulation of the fly height of each slider 110, which could otherwise cause a reduction in the recording performance or further contact between slider, 110 and the surface of the disc 107. Such contact can range from light contact to severe impact and can cause damage to stored data or permanent physical damage to the media.

Figure 2:
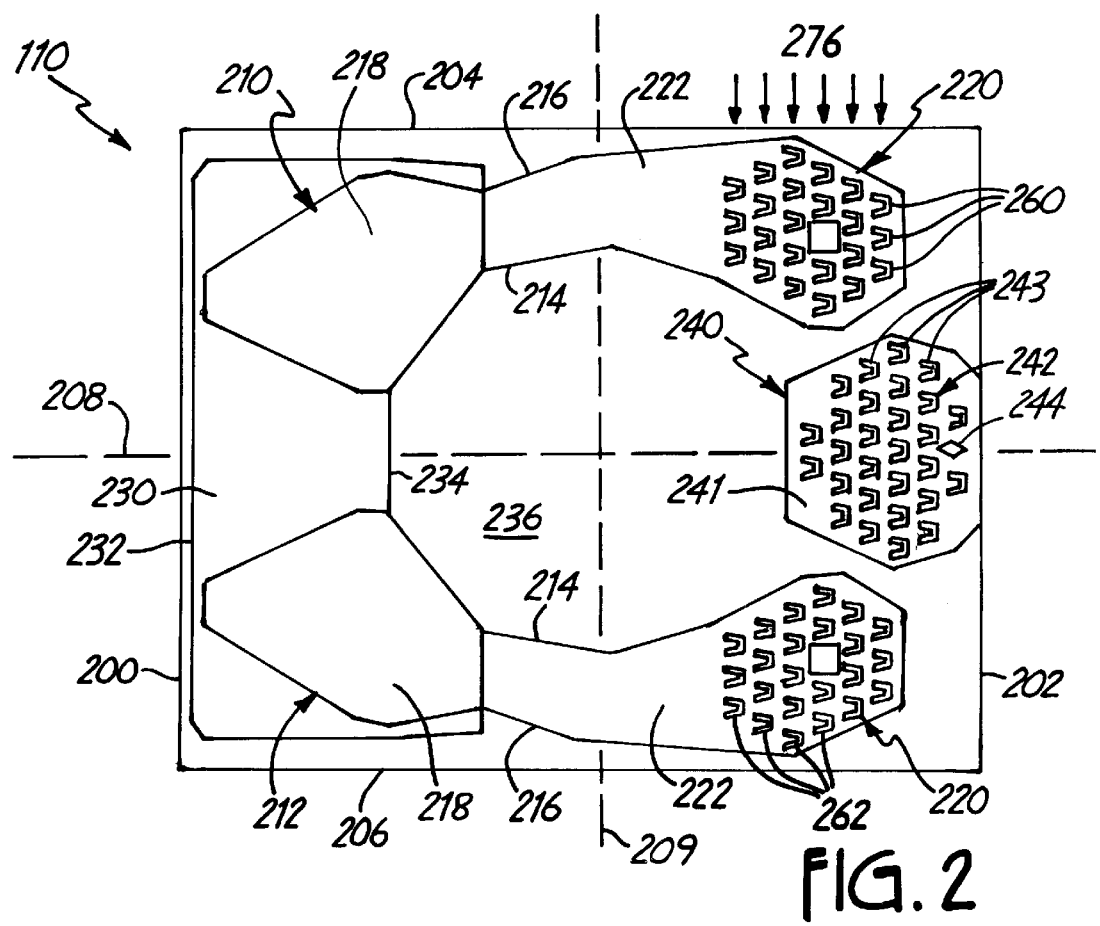
FIG. 2 is a bottom plan view of a slider shown in FIG. 1, as viewed from the surface of a disc, according to one embodiment of the present invention.

FIG. 2 is a bottom plan view of one of the sliders 110 of FIG. 1, as viewed from the surface of disc 107. Slider 110 has a leading edge 200, a trailing edge 202, side edges 204 and 206, a longitudinal axis 208 and a transverse center line 209. Elongated, raised side rails 210 and 212 are positioned along side edges 204 and 206, respectively. Rails 210 and 212 extend generally from leading slider edge 200 toward trailing slider edge 202 and terminate prior to trailing edge 202. However, rails 210 and 212 can extend all the way to trailing slider edge 202 in alternative embodiments. Each rail 210 and 212 has an inside rail edge 214, an outside rail edge 216, a leading bearing surface 218, a trailing bearing surface 220 and a recessed rail portion 222. Recessed rail portion 222 extends rearward from leading bearing surface 218 toward trailing bearing surface 220. In one embodiment, recessed rail portions 222 are generally parallel to and recessed from bearing surfaces 218 and 220 by a step depth of 0.1 to 0.5 um, for example. The recessed rail portions develop substantially ambient pressure during flight. Other depths can also be used in alternative embodiments. Trailing bearing surfaces 220 are formed by a plurality of isolated bearing pads 260 and 262, which are positioned on the trailing part of recessed rail portions 222 of rails 210 and 212, respectively. The upper surfaces of bearing pads 260 and 262 are generally coplanar with leading bearing surfaces 218, with a given crown and cross curvature of slider 110.

A cavity dam 230 extends between rails 210 and 212, along leading slider edge 200. Cavity dam 230 has a leading edge 232 and a trailing edge 234. Cavitydam 230 and side rails 210 and 212 define a subambient pressure cavity or central recess 236, which trails cavity dam 230 relative to a direction of air flow from the leading slider edge 200 toward trailing slider edge 202. In one embodiment, subambient pressure cavity 236 is recessed from leading and trailing bearing surfaces 218 and 220 by 1 to 3 um. Although recessed rail portions 222 are recessed from bearing surfaces 218 and 220, recessed rail portions 222 remain raised from the floor of cavity 236 such that the portions 222 continue to define the shape of the cavity 236 and contain subambient pressure within cavity 236.

In one embodiment, cavity dam 230 is generally parallel to and recessed from bearing surfaces 218 and 220 by a step depth of 0.1 to 0.5 um, for example. Other depths can also be used. In addition, cavity dam 230 can be formed with a tapered leading edge in alternative embodiments, if desired.

A raised center pad or rail 240 is positioned along trailing slider edge 202 and is centered along longitudinal axis 208. In alternative embodiments, center pad 240 can be skewed or offset with respect to axis 208. Center pad 240 has a recessed step surface 241 and a bearing surface 242. Recessed step surface 241 is generally parallel to and recessed from bearing surface 242 by a step depth of 0.1 to 0.5 um, for example, for providing pressurization of bearing surface 242 from air flow venting from cavity 236. Bearing surface 242 is formed by a plurality of isolated bearing pads 243, which are positioned on recessed step surface 241. The upper surfaces of bearing pads 243 are generally coplanar with the upper surfaces of bearing pads 260 and 262 and leading bearing surfaces 218, with the given crown and cross curvature of slider 110.

Center rail 240 supports a read/write transducer 244 along trailing slider edge 202. In alternative embodiments, transducer 244 can be positioned at other locations on slider 110. However, when placed at or near trailing slider edge 202, transducer 244 is located at the closest point on slider 110 to the surface of disc 107 (shown in FIG. 1) when slider 110 flies with a positive pitch angle. With a positive pitch angle, trailing slider edge 202 is closer to the surface of disc 107 than leading slider edge 200.

Rails 210 and 212 terminate prior to trailing slider edge 202 to allow slider 110 to roll about longitudinal axis 208 without risking contact between trailing rail edges 224 and the disc surface. Therefore, trailing edge of center pad 240 remains the closest location on slider 110 to the disc surface during flight at relatively large roll angles, thereby improving read and write performance. However, truncating side rails 210 and 212 reduces the amount of positive pressure developed along the rails near trailing slider edge 202, which reduces pitch and roll stiffness.

In order to limit the reduction in pitch and roll stiffness and to provide a large number of pressure gradients for dampening vibrations in slider 110, bearing surfaces 220 of rails 210 and 212 and bearing surface 242 each have a large number isolated bearing pads 260, 262 and 243. For example, reasonable damping can be achieved by forming at least twenty isolated bearing pads on a particular bearing surface. More than twenty bearing pads can be used in alternative embodiments, such as more than 50 or more than 100 bearing pads, to achieve a greater number of pressure gradients.

Each bearing pad 260, 262, 243 has a length measured along longitudinal axis 208 and a width measured along transverse axis 209. The length and width of each bearing pad 260, 262 and 243 are at least one percent of the length of slider 110, as measured along longitudinal axis 208, such that each bearing pad has a sufficient surface area on slider 110 for forming a bearing surface (e.g. air bearing surface). In one embodiment, the length and width of each bearing pad 260, 262 and 243 are at least 10 microns. Each pad can have a variety of shapes, such as U-shaped or rectangular.

Figure 3:
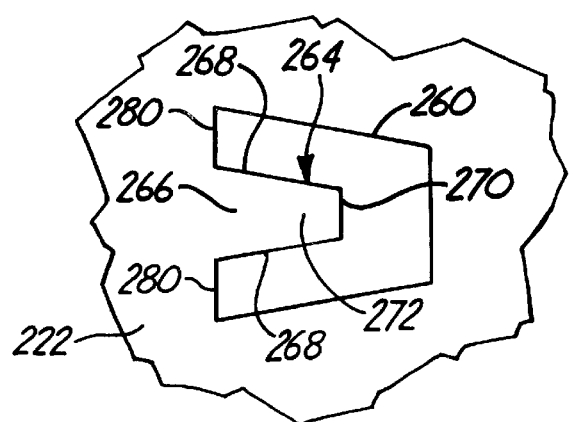
FIG. 3 is an enlarged, fragmentary view of a bearing pad having a convergent channel feature, within the slider shown in FIG. 2.

In the embodiment shown in FIG. 2, most of the isolated bearing pads 260, 262 and 243 include a convergent channel feature, which is recessed within the respective bearing pad. These channel features can also be referred to as trenches. FIG. 3 is an enlarged view of one of the isolated bearing pads 260, for example, which shows the convergent channel feature in greater detail. Convergent channel feature 264 has a leading channel end 266, non-divergent side walls 268, a trailing channel end 270 and a channel floor (or "step surface") 272. Channel 264 also has a side wall 280 to either side of the leading channel ends 266. Channel 264 is formed through photolithography processes such as ion milling, chemical etching or reactive ion etching (RIE). With these processes, the depth and location of the channels can be accurately controlled. In the embodiment shown in FIG. 3, side walls 268 converge toward one another as the side walls extend from leading channel end 266 toward trailing channel end 270, and join at trailing channel end 270. In an alternative embodiment (not shown), side walls 268 extend parallel to one another. Channel floors 272 are coplanar and contiguous with the respective recessed rail portions 222 of rails 210 and 212. Similarly, the channel floors 272 of the channels in bearing pads 243 are coplanar and contiguous with the recessed step surface 241 of center rail 240. In alternative embodiments, channel floors can have different depths than recessed rail portions 222 and recessed step surface 241 and can be tapered from leading channel end 266 to trailing channel end 270.

In each channel 264, leading channel end 266 is open to fluid flow from the respective recessed area 222 or step surface 241. However, trailing channel end 270 is closed to the fluid flow. During operation, the side walls 280 to either side of leading channel ends 266 present themselves as a substantial pressure rise to the local fluid flow. Since the opening to each channel, at leading channel ends 266, does not have the same pressure rise, it is seen as a preferential path for the fluid flow to travel. Once the fluid flow enters channels 264, the flow is essentially bounded by channel side walls 268 and trailing channel end 270 and is forced to rise over trailing channel end 270. This creates localized pressure gradients at discrete regions along bearing pads 260, 262 and 243 rearward of trailing channel ends 270. In one embodiment, each bearing pad 260, 262 and 264 has a length measured from trailing channel end 270 to the trailing edges of the bearing pad that is equal to or greater than the maximum width of channels 264, as measured between side walls 268. This provides enough of a bearing surface on which the localized positive pressure gradients can act. The localized positive pressure gradients developed on bearing pads 260 and 262 assist in providing roll stiffness to slider 110 and provide an energy dissipation mechanism during slider vibration, which dampens leading edge pitch and roll mode type vibrations at the slider's natural resonance frequencies. Leading edge pitch refers to rotation about a line near the leading edge of the slider, whereas trailing edge pitch refers to rotation about a line near the trailing edge of the slider. Roll mode type vibrations refer to rotation about the slider's longitudinal center line. The localized positive pressure gradients developed on bearing pads 243 increase the pitch stiffness of slider 110 and provide an energy dissipation mechanism during slider vibration, which dampens leading edge pitch mode type vibrations at the slider's natural resonance frequencies.

The amount of damping is proportional to the magnitude of the gradients that exist in the pressure field between slider 110 and the disc surface. These pressure gradients are largest where the head-disc spacing changes most rapidly. The arrays of bearing pads on slider 110 therefore provide a great number of height transitions, and the convergent channel features increase the pressure gradients formed by these transitions.

Referring back to FIG. 2, isolated bearing pads 260, 262 and 243 are arranged in a plurality of rows, such as those indicated by arrows 276 for bearing pads 260, which extend parallel to transverse axis 209. Individual ones of the bearing pads in each row are offset along transverse axis 209 with respect to individual ones of the bearing pads in each adjacent row. This offset induces greater flow into each convergent channel, which results in a larger pressure gradient formed by each channel. Channels 264 can be arranged symmetrical about longitudinal axis 208, as shown in FIG. 2, or can be asymmetrical to provide preferential pressurization at certain slider skew angles. The size and intensity of the localized positive pressure areas depend on the channel length to width ratio, the absolute sizes of the channels and the depth and shape of the channel floors. In one embodiment, the ratio of the channel lengths to the channel widths range from 0.5 to 5.0, but may vary outside that range depending the design purposes of the channel feature. In another embodiment, the length to width ratio ranges from 2.0 to 2.5.

Figure 4:
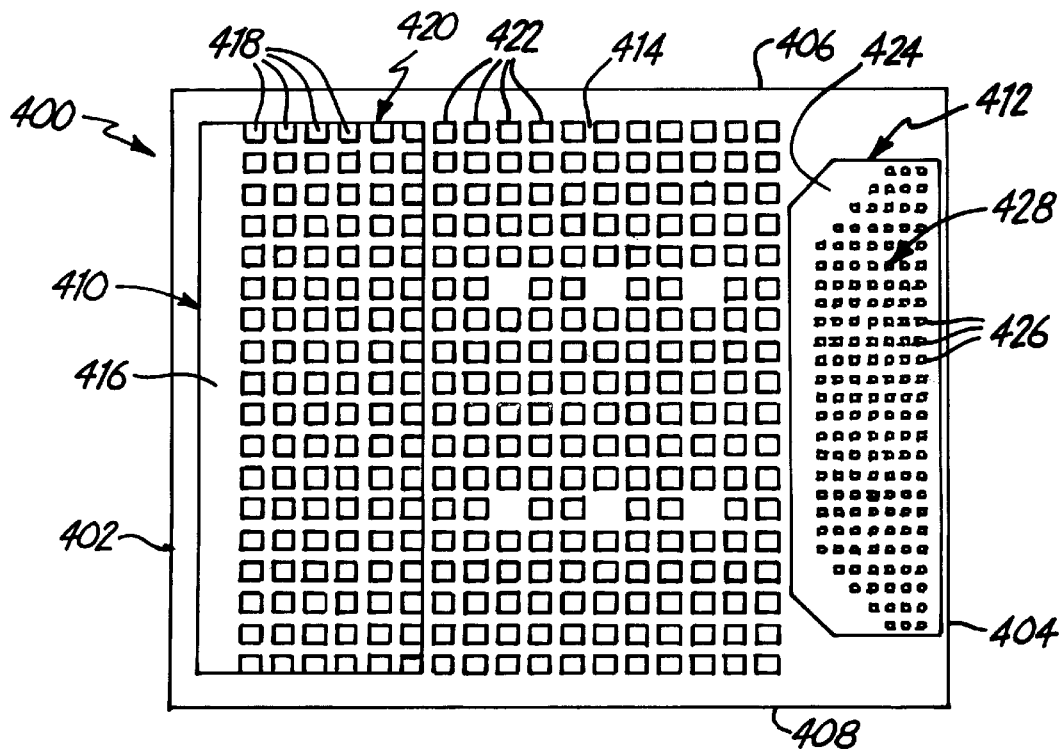
FIG. 4 is a bottom plan view of a slider having an alternative bearing geometry, according to an alternative embodiment of the present invention.

FIG. 4 is a bottom plan view of a slider 400 according to an alternative embodiment of the present invention. Slider 400 has a leading edge 402, a trailing edge 404 and side edges 406 and 408. A leading rail 410 extends from side edge 406 to side edge 408, along leading edge 402. A relatively wide center rail 412 extends along trailing slider edge 404. A central recess area 414 is positioned between leading rail 410 and trailing, center rail 412.

Leading rail 410 includes a relatively large recessed step surface 416 and a leading bearing surface 420 defined by an array of 192 isolated bearing pads 418, which are positioned on step surface 416. However, other numbers of bearing pads can be used in alternative embodiments. Leading step surface 416 is recessed from bearing pads 418 by a step depth of about 0.1 to 0.5 microns, for example, while central recessed area is recessed from bearing pads 418 by about 1–3 microns, for example. Similarly, an array of 192 isolated bearing pads 422 are formed in central recess area 414, which are generally coplanar with bearing pads 418. Trailing center rail 412 includes a relatively large recessed step surface 424 and a trailing bearing surface 428 defined by an array of 180 isolated bearing pads 426, which are positioned on step surface 424. Bearing pads 426 are generally coplanar with bearing pads 418 and 422.

Each of the bearing pads 418, 422 and 426 are shown as having a rectangular shape. However, these bearing pads can be shaped similar to bearing pads 260, 262 and 243 shown in FIG. 2 and can have similar convergent channel features. The isolated bearing pads 418, 422 and 428 provide slider 400 with a great number of height transitions. These height transitions provide a large number of pressure gradients that serve to dampen vibrations in slider 400 to thereby limit fly height modulations during operation.

Figure 5:
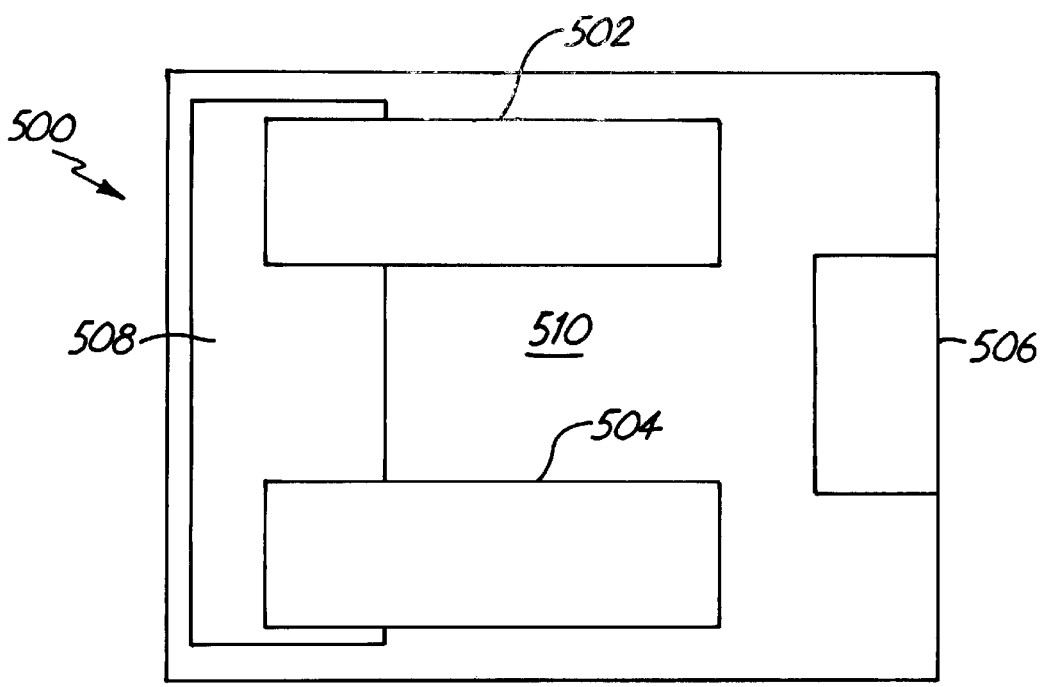
FIG. 5 is a bottom, perspective view of a prototypical NPAB slider of the prior art.

The damping provided by sliders 110 and 400 shown in FIGS. 2 and 4 were compared with a slider having a prototypical negative pressure air bearing, as shown in FIG. 5. Slider 500 includes a pair of side rails 502 and 504, a trailing center rail 506, a recessed cavity dam 508 and a sub-ambient pressure cavity 510.

Figure 6:
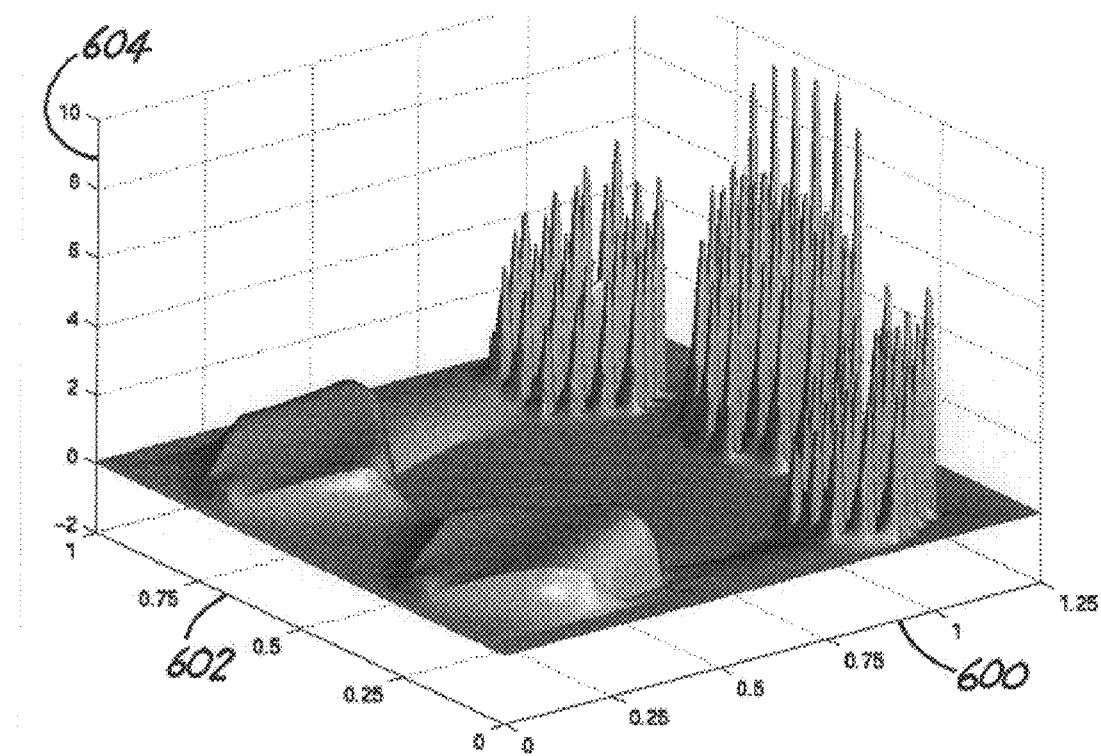
FIGS. 6–8 are three dimensional diagrams illustrating pressure profiles across the bearing surfaces of the sliders shown in FIGS. 2, 4 and 5, respectively.
Figure 7:
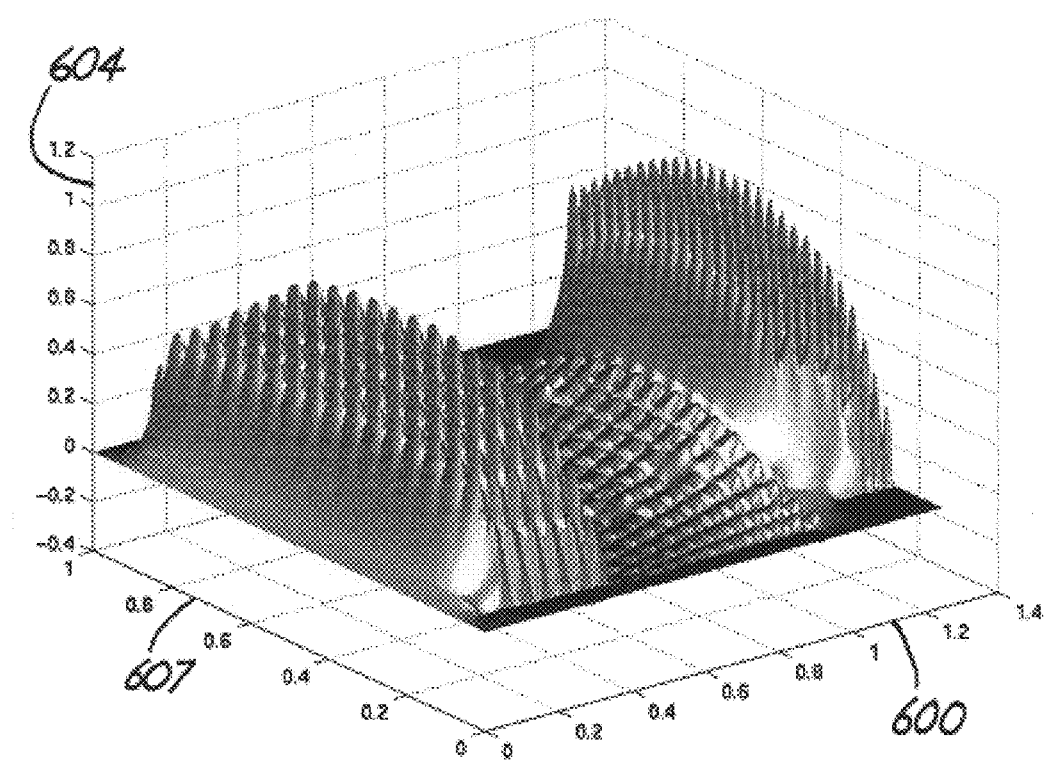
Figure 8:
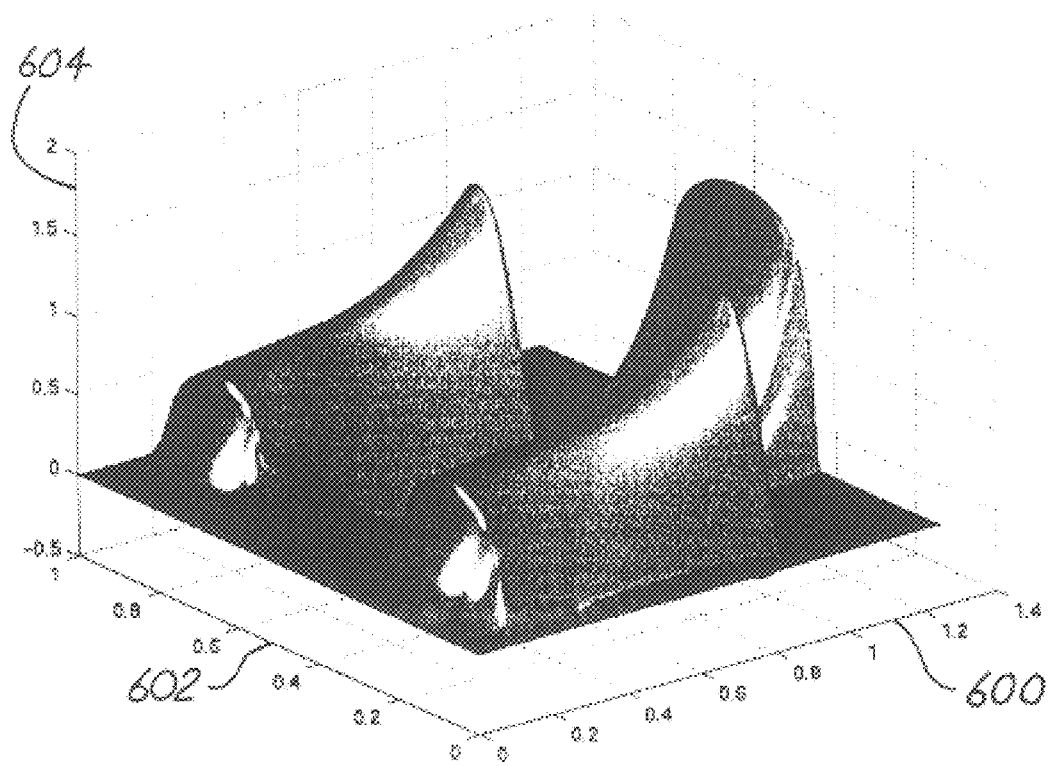

FIGS. 6, 7 and 8 are three dimensional diagrams illustrating pressure profiles across the bearing surfaces of sliders 110, 400 and 500, respectively. In each diagram, axis 600 represents distance along the side edges of the slider, axis 602 represents distance along the leading edge of the slider, and axis 604 represents pressure amplitude. Looking at FIGS. 6, 7 and 8, it is apparent that sliders 110 and 400 provide many more pressure gradients than the prototypical slider 500 shown in FIG. 5. This results in improved damping of the impulse responses of sliders 110 and 500 and their resulting fly height modulations.

The amount of damping provided by each of the sliders 110, 400 and 500 was measured by applying an impulse excitation to the three degrees of freedom for each air bearing, including vertical, pitch and roll. The impulse responses to each of the three modes of vibration (leading edge pitch, trailing edge pitch and roll) were then analyzed by modal analysis to determine the damping ratios for each slider.

Figure 9A:
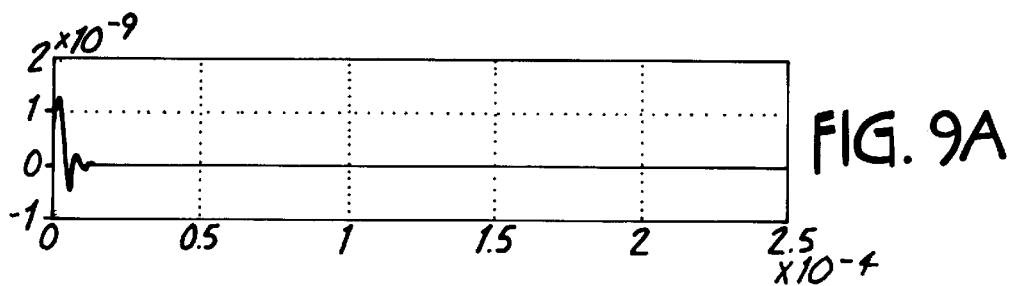
FIGS. 9A–9C are graphs illustrating simulated fly height, pitch and roll impulse responses, respectively, of the slider shown in FIG. 2.
Figure 9B:
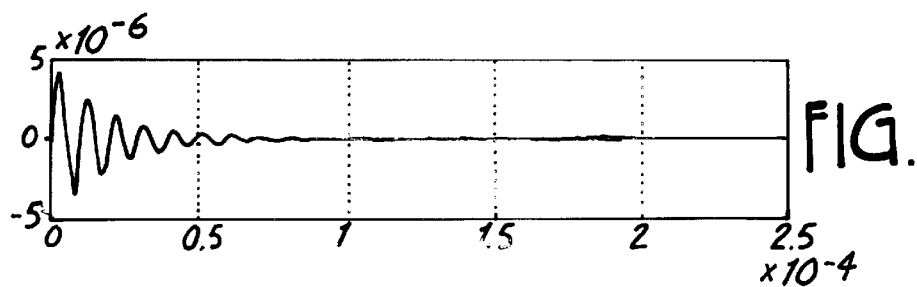
Figure 9C:
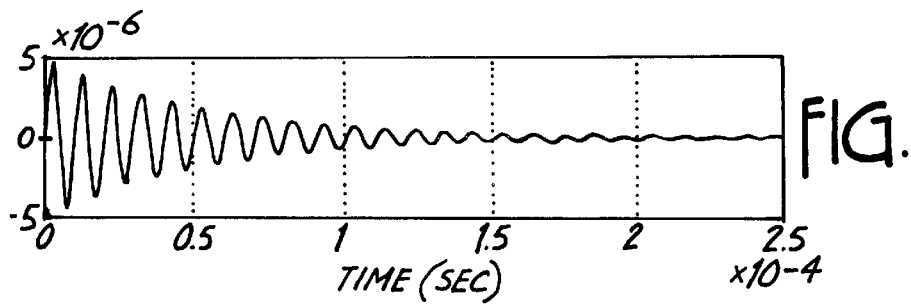

FIGS. 9A, 9B and 9C are graphs showing the simulated leading edge pitch, roll, and trailing edge pitch impulse responses, respectively, of slider 110 from an impulse vibration input occurring at time zero. The X-axis in FIGS. 9A–9C represents time in seconds ($\times 10^{-4}$). The Y-axis in FIGS. 9A–9C represents rotation in radians. As can be seen in FIGS. 9A and 9B, the impulse responses of slider 110 to vertical and pitch mode excitations dampen quickly in less than 100 microseconds.

Figure 10A:
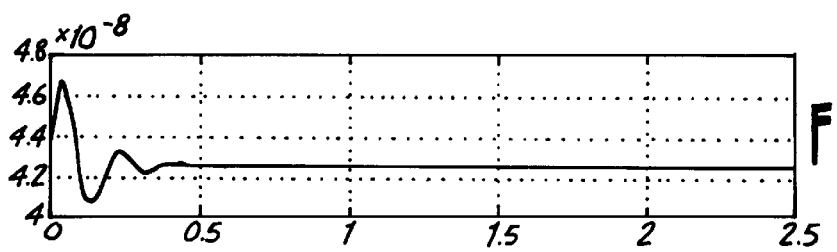
FIGS. 10A–10C are graphs illustrating simulated fly height, pitch and roll impulse responses, respectively, of the slider shown in FIG. 4.
Figure 10B:
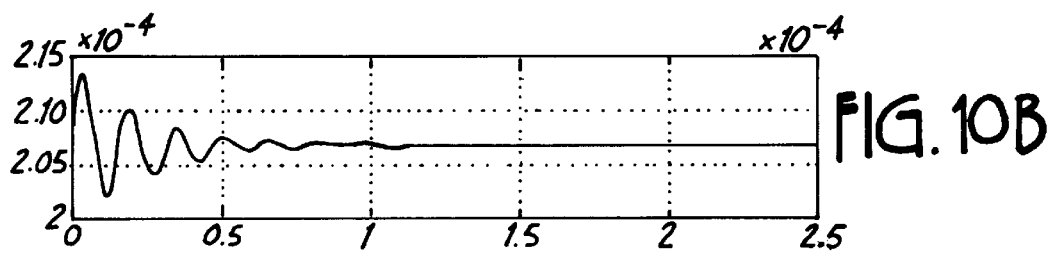
Figure 10C:
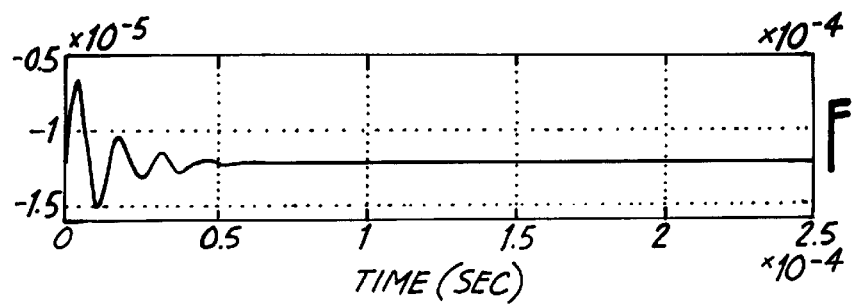

FIGS. 10A–10C are graphs showing the leading edge pitch, roll, and trailing edge pitch impulse responses, respectively, of slider 400, similar to FIGS. 9A–9C. As compared to the impulse responses of slider 110 shown in FIGS. 9A–9C, the vertical and pitch mode impulse responses of slider 400 are similar to that of slider 110. However, due to the relatively wide center rail of slider 400, the roll mode impulse response of slider 400 is improved over the roll mode impulse response of slider 110.

Figure 11A:
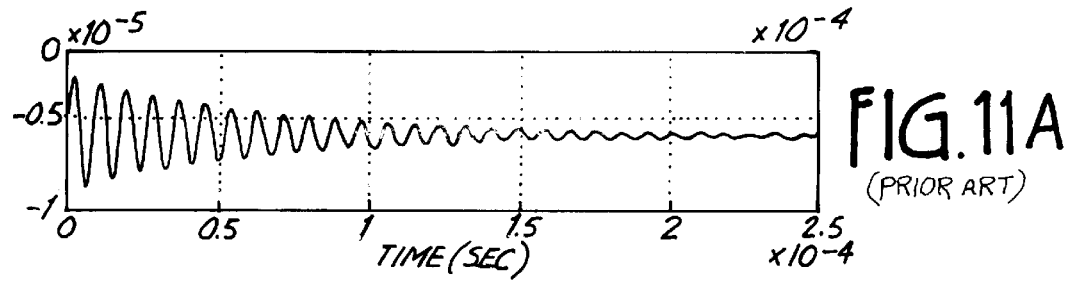
FIGS. 11A–11C are graphs illustrating simulated fly height, pitch and roll impulse responses, respectively, of the slider shown in FIG. 5.
Figure 11B:
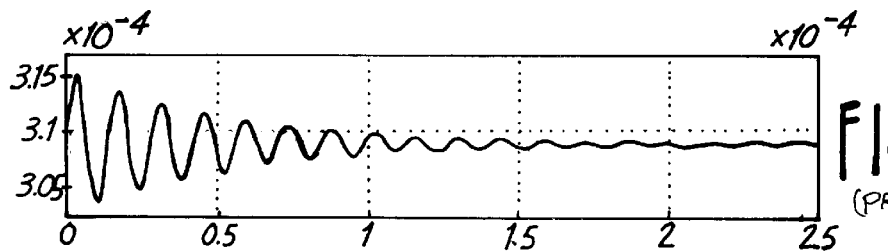
Figure 11C:
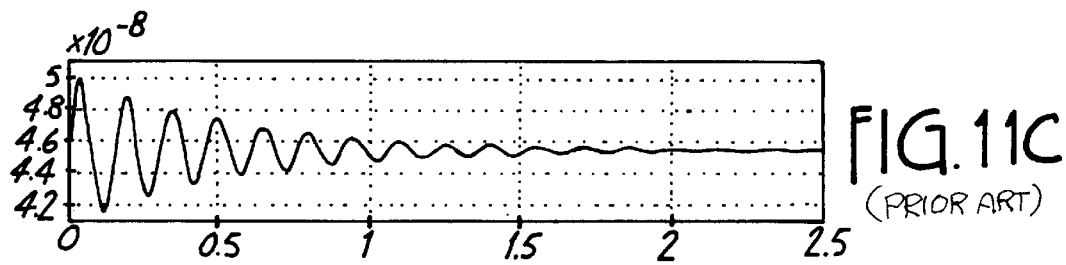

FIGS. 11A–11C are graphs showing the leading edge pitch, roll, and trailing edge pitch impulse responses, respectively, of the prototypical slider 500 shown in FIG. 5. The impulse responses of slider 500 take quite along time to stabilize, as compared to the impulse responses of sliders 110 and 400.

Tables 1–3 show the percent of critical damping generated by modal analysis for sliders 500, 400 and 110, respectively, for leading edge pitch, roll and trailing edge pitch mode type excitations. Slider 400, shown in Table 2, has approximately five times the damping as slider 500 shown in Table 1. Slider 110, shown in Table 3, has approximately five times the damping for leading edge pitch mode excitations, twice the damping for roll mode excitations and about 1.5 times the damping for trailing edge pitch mode excitations. This damping significantly reduces fly height modulations of the slider during operation.

TABLE 1

| MODE | FREQUENCY (kHz) | DAMPING (%) |
|---|---|---|
| LE EDGE PITCH | 115.53 | 4.51 |
| ROLL | 71.11 | 4.54 |
| TR EDGE PITCH | 66.39 | 2.01 |

TABLE 2

| MODE | FREQUENCY (kHz) | DAMPING (%) |
|---|---|---|
| LE EDGE PITCH | 70.68 | 27.20 |
| ROLL | 63.86 | 10.88 |
| TR EDGE PITCH | 51.07 | 17.94 |

TABLE 3

| MODE | FREQUENCY (kHz) | DAMPING (%) |
|---|---|---|
| LE EDGE PITCH | 155 | 30.0 |
| ROLL | 102 | 8.4 |
| TR EDGE PITCH | 98.5 | 3.0 |

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope and spirit of the present invention. In addition, although the slider example described is a negative pressure slider, it will be appreciated by those skilled in the art that the teachings of the present invention can be applied to other types of sliders, such as positive pressure slider having no cavity dam without departing from the scope and spirit of the present invention. Also, the present invention can be used with any type of suspension, such as rotary and linear suspensions, and the transducing head can be of any type such as magnetic, magneto-resistive, optical or magneto-optical, for example.

What is claimed is:

1. A disc head slider comprising:

a slider body having a leading edge and a trailing edge and a slider length measured from the leading edge to the trailing edge;

a central recess floor; and a plurality of raised rails, including a center rail positioned generally along the trailing edge and rearward of the central recess floor, which form respective bearing surfaces, wherein the center rail comprises a recessed rail surface, which is recessed from the respective bearing surface and raised from the central recess floor, and at least twenty isolated bearing pads, which are positioned on the recessed rail surface and together form at least part of the respective bearing surface, wherein each bearing pad comprises a pad length, which is measured along the slider length, and a pad width, which is transverse to the slider length, that are at least one percent of the slider length.

2. The disc head slider of claim 1 wherein the pad length and the pad width are at least ten microns.

3. The disc head slider of claim 1 wherein each bearing pad forms a rectangular pad bearing surface.

4. The disc head slider of claim 1 wherein each bearing pad forms a generally U-shaped pad bearing surface.

5. The disc head slider of claim 1 wherein each bearing pad comprises a convergent channel, which is recessed within the bearing pad and comprises a leading channel end open to fluid flow from the recessed rail surface, channel side walls and a trailing channel end closed to the fluid flow and forward of a localized region of the respective bearing pad.

6. The disc head slider of claim 5 wherein each convergent channel further comprises a channel floor, which is coplanar and contiguous with the respective recessed rail surface.

7. The disc head slider of claim 1 and further comprising a longitudinal axis and a transverse axis, wherein the plurality of isolated bearing pads are arranged in a plurality of rows extending parallel to the transverse axis, and wherein individual ones of the bearing pads in each row are offset along the transverse axis with respect to individual ones of the bearing pads in each adjacent row.

8. A disc head slider comprising:

a central recess floor; and first and second rails disposed about the central recess floor, wherein each of the rails comprises, a leading bearing surface, a recessed rail surface and a trailing bearing surface, wherein the recessed rail surface extends rearward from the respective leading bearing surface, is recessed from the respective leading and trailing bearing surfaces and is raised from the central recess floor, and wherein the trailing bearing surface is formed at least in part by a plurality of isolated bearing pads positioned on the recessed rail surface, wherein each bearing pad comprises a convergent channel, which is recessed within the bearing pad and comprises a leading channel end open to fluid flow from the recessed rail surface, non-divergent channel side walls and a trailing channel end closed to the fluid flow and forward of a localized region of the respective bearing pad.

9. The disc head slider of claim 8 wherein the plurality of bearing pads positioned on each of the first and second rails comprises at least twenty bearing pads.

10. The disc head slider of claim 8 wherein the slider has a slider length and each bearing pad comprises a pad length, which is measured along the slider length, and a pad width, which is transverse to the slider length, that are at least one percent of the slider length.

11. The disc head slider of claim 10 wherein the pad length and the pad width are at least ten microns.

12. The disc head slider of claim 8 wherein each bearing pad forms a generally U-shaped pad bearing surface.

13. The disc head slider of claim 8 and further comprising a leading slider edge, a trailing slider edge, a longitudinal axis and a transverse axis, and wherein the plurality of isolated bearing pads are arranged in a plurality of rows extending parallel to the transverse axis, wherein individual ones of the bearing pads in each row are offset along the transverse axis with respect to individual ones of the bearing pads in each adjacent row.

14. The disc head slider of claim 8 wherein each convergent channel comprises a channel floor, which is coplanar and contiguous with the respective recessed rail surfaces of the first and second rails.

15. The disc head slider of claim 14 wherein the channel floors and the recessed rail surfaces are recessed from the leading and trailing bearing surfaces by 0.1 to 0.5 microns, and the central recess floor is recessed from the leading and trailing bearing surfaces by at least 1 micron.

16. The disc head slider of claim 8 and further comprising a cavity dam, wherein the central recessed floor forms a subambient pressure cavity, which trails the cavity dam.

17. The disc head slider of claim 16 and further comprising:

a leading slider edge;

a trailing slider edge; and a center rail positioned between the first and second rails, wherein the center rail comprises a center rail bearing surface, which trails the subambient pressure cavity, and a recessed step surface, which is raised from the subambient pressure cavity and is recessed from the center rail bearing surface, wherein the center rail bearing surface is formed at least in part by at least twenty isolated center rail bearing pads positioned on the center rail, wherein each center rail bearing pad comprises a pad length and a pad width, which are at least one percent of a length of the slider as measured from the leading slider edge to the trailing slider edge.

18. A disc drive assembly comprising:

a disc rotatable about a central axis; and a slider supported over the disc and having a bearing surface with convergent channel means for generating at least twenty individual pressure gradients along the bearing surface, which are adapted for dampening vibrations in the slider as the disc rotates beneath the slider about the central axis.

* * * * *